C. W. HOTTMANN, Jr.
MIXER.
APPLICATION FILED OCT. 13, 1921.

1,406,457.

Patented Feb. 14, 1922.
2 SHEETS—SHEET 1.

INVENTOR
Charles W. Hottmann, Jr.
BY
Niedershein Fairbanks
ATTORNEYS

C. W. HOTTMANN, Jr.
MIXER.
APPLICATION FILED OCT. 13, 1921.

1,406,457.

Patented Feb. 14, 1922.
2 SHEETS—SHEET 2.

ON LINE 4—4. FIG. 1.

INVENTOR
Charles W. Hottmann Jr.
BY
ATTORNEYS

UNITED STATES PATENT OFFICE.

CHARLES W. HOTTMANN, JR., OF SANDUSKY, OHIO.

MIXER.

1,406,457.  Specification of Letters Patent.  Patented Feb. 14, 1922.

Application filed October 13, 1921. Serial No. 507,454.

*To all whom it may concern:*

Be it known that I, CHARLES W. HOTTMANN, Jr., a citizen of the United States, residing at Sandusky, county of Erie, State of Ohio, have invented a new and useful Mixer, of which the following is a specification.

My invention comprehends a novel construction of a mixer by the employment of which any suitable materials can be properly mixed together.

It further comprehends a novel construction of a mixer wherein a novel circulation is imparted to the materials which are being mixed.

It further comprehends a novel construction and arrangement of a casing adapted to receive the materials to be mixed said casing having an inlet and discharge port in communication with a novel construction and arrangement of a conveyor adapted to effect the circulation and mixing of the materials and also the discharge of the mixed materials from the mixer.

It further comprehends a novel construction and arrangement of agitator and scraping member and novel means for actuating them.

It further comprehends a novel construction of a mixer wherein the casing which receives the materials to be mixed is stationary and in which revolves a novel construction and arrangement of agitating and scraping elements in combination with a novel construction of conveyor or feeding mechanism arranged at one side of the center of the casing and having an inlet and a discharge port in free communication with said casing.

Other novel features of construction and advantage will hereinafter more fully appear in the detailed description of the invention.

For the purpose of illustrating my invention, I have shown in the accompanying drawings a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Similar numerals of reference indicate corresponding parts.

Figure 1:
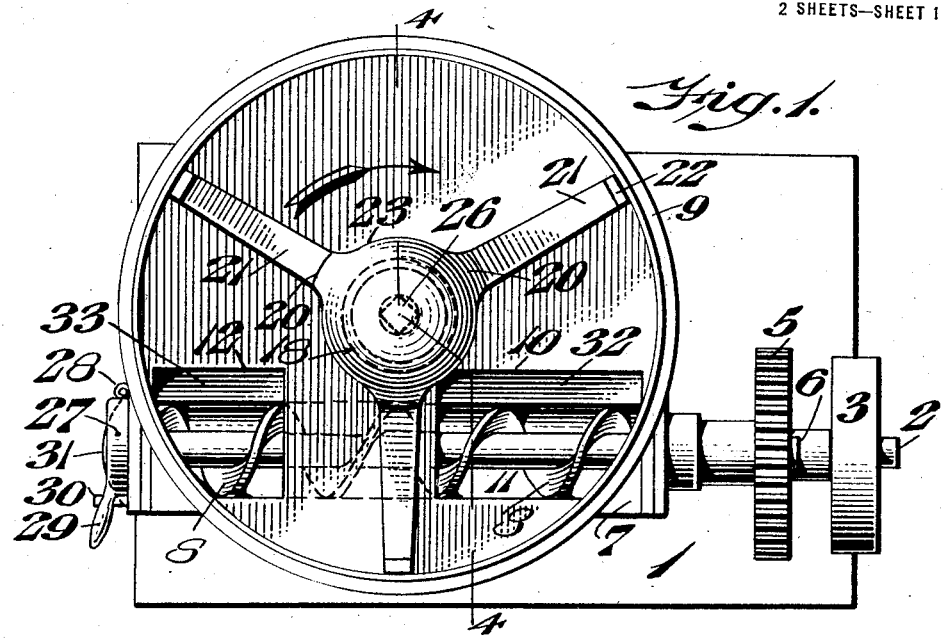
Figure 1 represents a top plan view of a mixer, embodying my invention.
Figure 2:
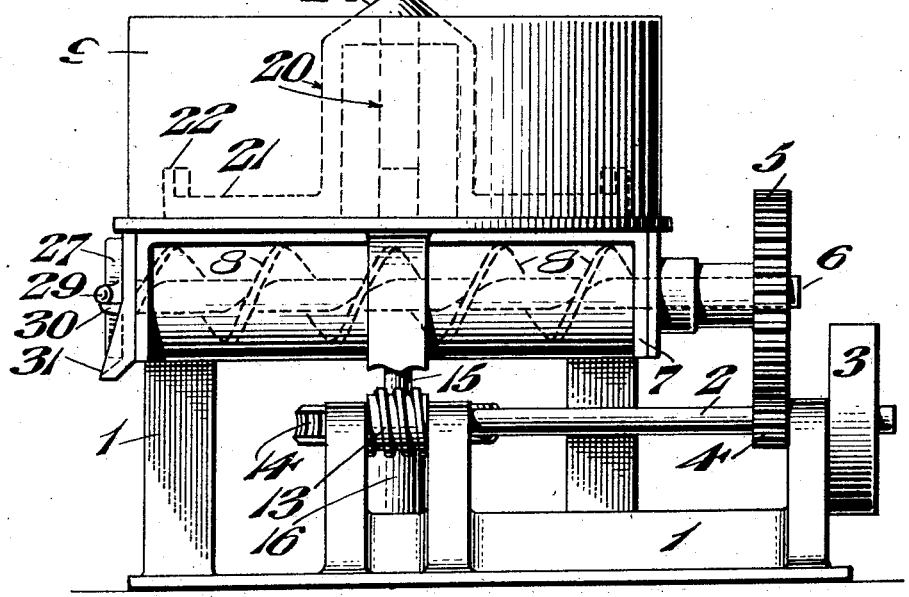
Figure 2 represents a mixer in front elevation.
Figure 3:
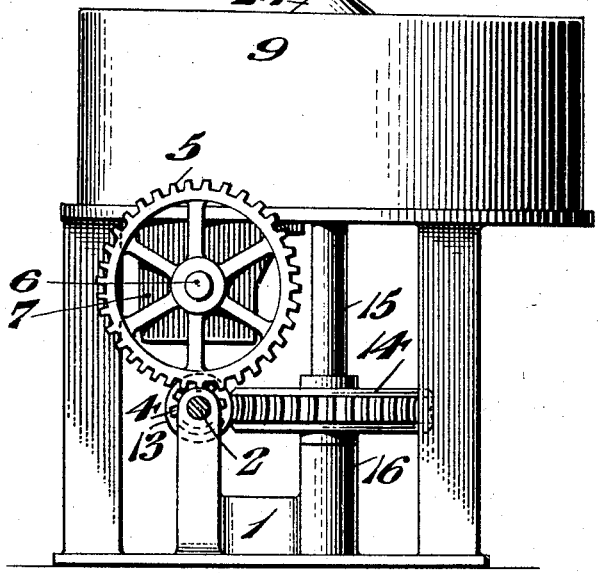
Figure 3 represents an end elevation of the mixer.

Referring to the drawings, 1 designates the frame of a mixer embodying my invention. The frame 1 has journalled in it a main driving shaft 2 provided with a pulley 3 whereby it may be driven by any desired source of power. The driving shaft 2 has fixed thereon a pinion 4 which meshes with a gear 5 mounted on a conveyor or feed shaft 6 which is journalled in a feed casing 7. The shaft 6 is provided with a helical blade 8. The feed casing 7 is secured in any desired manner with the bottom of a stationary casing 9 carried by the frame and adapted to receive the materials to be mixed. The casing 9 is provided in its bottom with an inlet port 10 leading to the chamber 11 of the feed casing 7 and with a port 12 leading from the chamber 11 of the feed casing 7.

The driving shaft 2 is provided with a worm 13 which meshes with a worm wheel 14 carried by a shaft 15 which is vertically disposed and is journalled in a lower bearing 16 and an upper bearing 17. The upper bearing 17 is secured in any desired manner with a centrally located upwardly extending sleeve 18 which is connected with the bottom of the casing 9 which receives the material to be mixed.

The agitating and scraping elements are constructed and driven in a novel manner. A plurality of these agitating and scraping elements 20 are employed. Each agitating and scraping element consists of a bar which is vertically disposed in close proximity to the sleeve 18 and at its lower end it is deflected, as at 21, in order to engage the bottom of the stationary casing 9 and its free end is upwardly deflected, as at 22, and preferably curved so as to engage the side wall of the casing 9 and such upwardly deflected portion 22 terminates a desired distance from the upper open end of the casing 9.

The agitating elements 20 are connected with a centrally located hub or support 23, the upper face of which diverges downwardly, as indicated at 24. The support 23 is provided with a polygonal shaped aperture 25 with the walls of which a polygonal shaped end 26 of the shaft 15 is adapted to engage in order to effect the rotation of the support 23 and thereby of the agitating elements 20. The feed casing 7 has its forward end controlled by means of a door 27 which is hinged, as at 28, and provided with a handle 29 which interlocks with a catch 30. The feed casing 7 at its discharge end is downwardly deflected, as at 31, in order to form a discharge spout.

Figure 4:
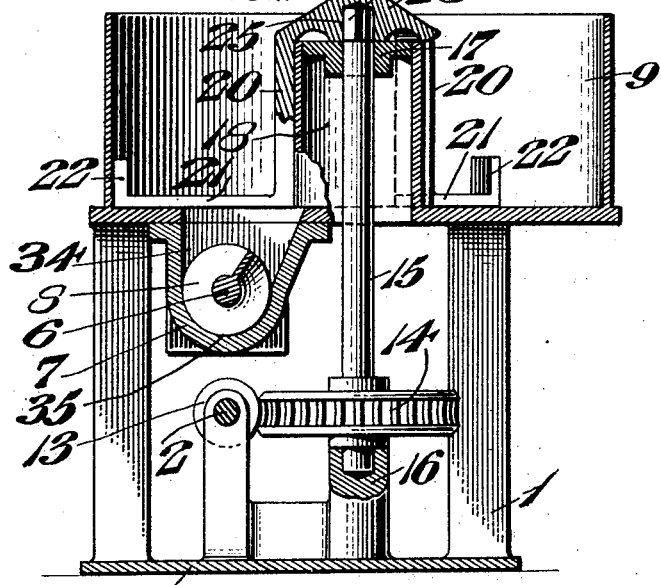
Figure 4 represents a section on line 4—4 of Figure 1.

It will be seen from Figures 1 and 4 that one wall of the inlet port 10 and the feed casing wall in proximity thereto is outwardly and downwardly inclined, as at 32, and the inner wall of the casing in proximity to the discharge port 12 is inclined or bevelled in a similar manner, as seen at 33. The opposite wall of the feed casing is substantially straight, as indicated at 34, while its bottom wall is rounded as will be best understood by reference to Figure 4.

The operation of my novel mixer will now be apparent to those skilled in the art to which this invention appertains and is as follows:

The material which is to be mixed is placed within the casing 1. The driving shaft 2 which is driven by any desired source of power effects the rotation of the shaft 15 and thereby of the agitating and scraper members 20 so that such members travel in the direction of the arrow seen in Figure 1. This will cause the materials to be fed towards the inlet port 10 through which the materials pass to the feed chamber 11. In this feed chamber 11 the feed screw or conveyor 8 forces the materials toward the forward end of the feed chamber 11 thereby causing them to pass upwardly through the delivery port 12 into the casing 9 so that the circulation of the materials during the mixing operation is brought about. After the materials have been properly mixed the door 27 is opened and the material will be fed from the feed chamber 11 and will discharge from the delivery spout 31.

The scraping blades will prevent the material adhering to the bottom and to the sides of the casing 9 so that all of the materials in the casing 9 will be discharged therefrom. The driving shaft 2 is intergeared with the feed shaft 6 so that the latter is driven at the proper speed, it being apparent from the drawings that the agitator or scraping blade has a slow revolving movement imparted thereto while the feed shaft 6 is driven at a higher speed.

It will now be apparent that I have devised a new and useful construction of a mixer which embodies the features of advantage enumerated as desirable in the statement of the invention and the above description, and while I have, in the present instance, shown and described an embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. In a mixer, a stationary casing having spaced ports in its bottom one of which serves as an inlet port and the other as a discharge port, a feed casing, and a feed screw in said feed casing in proximity to said ports and exterior of said casing to cause the material to feed from said discharge port to said inlet port and to circulate in said casing, said feed casing having an additional discharge port through which the material is discharged after being mixed.

2. In a mixer, a stationary casing having spaced ports in its bottom one of which serves as an inlet port and the other as a discharge port, a feed screw in proximity to said ports and exterior of said casing to cause the material to feed from said discharge port to said inlet port and to circulate in said casing, and an auxiliary rotary member in said casing to facilitate the circulation therein of the material being mixed.

3. In a mixer, a casing having in its bottom an inlet port and a discharge port, a feed casing beneath said bottom communicating with said ports and having one wall in proximity to said ports substantially straight and its opposite wall inclined, a conveyor in said feed casing, and actuating means for said conveyor.

4. In a mixer, a casing having in its bottom an inlet port and a discharge port, a feed casing communicating with said port, a conveyor in said feed casing, means to actuate said conveyor, an agitating and scraping element in said stationary casing to facilitate the feed of material toward said discharge port, and means to actuate said element.

5. In a mixer, a casing having in its bottom an inlet port and a discharge port, a feed casing beneath said bottom communicating with said ports, a conveyor in said feed casing, actuating means for said conveyor, said feed casing having a discharge opening in alignment with said conveyor, and a door controlling said discharge opening.

6. In a mixer, a casing having an inlet port and a discharge port in its bottom, a feed casing communicating with said ports, a conveyor in said feed casing, a rotary element in said stationary casing, and means to actuate said conveyor and rotary element and to cause said conveyor to be rotated at a greater speed than the speed of rotation of said rotary element.

7. In a mixer, a casing having in its bottom an inlet port and a discharge port, said casing having its central portion upwardly deflected, a bearing in proximity to said upwardly deflected portion, a shaft journalled in said bearing, an agitating and scraping element mounted on said shaft and having blades which engage the bottom and side walls of said casing, a conveyor to effect the passage of material from said discharge port to said inlet port, and means to actuate said shaft and said conveyor.

8. In a mixer, a casing having in its bottom an inlet port and a discharge port, said casing having its central portion upwardly deflected, a bearing in proximity to said upwardly deflected portion, a shaft journalled in said bearing, an agitating and scraping element mounted on said shaft and having blades which engage the bottom and side walls of said casing, a conveyor to effect the passage of material from said discharge port to said inlet port, and means to actuate said shaft and said conveyor, said agitating and scraping element including a centrally located support, the upper face of which diverges downwardly.

CHARLES W. HOTTMANN, Jr.

Witnesses:
FERDINAND C. H. MÜLLER,
CONRAD HUNTER.